Patented June 22, 1948

2,443,962

UNITED STATES PATENT OFFICE 2,443,962

METHOD OF PRODUCING ANTIBIOTIC SUBSTANCE

Geoffrey W. Rake, Milltown, Oskar Wintersteiner, Dewey Heights, and Harold B. MacPhillamy and Clara M. McKee, New Brunswick, N. J., assignors to E. R. Squibb & Sons, New York, N. Y., a corporation of New York No Drawing. Application December 4, 1943, Serial No. 512,986

2 Claims. (Cl. 195—36)

This invention relates to antibiotic substances.

Prior to this invention, it has been shown that the mold *Aspergillus flavus*, when grown on certain liquid media, produced an antibiotic substance called aspergillic acid (White, E. C., Science, 1940, 92, 127). It has now been found that the same mold, when grown in submerged culture, produces an entirely different antibiotic substance (hereinafter called "the antibiotic substance"), which promises to have the same clinical applications and efficacy as penicillin.

It is the object of this invention to provide the antibiotic substance and its antibiotic alkali salts, and methods for the preparation thereof.

In the practice of this invention, a suitable liquid nutrient medium is inoculated with a spore suspension of *Aspergillus flavus*, the mold is incubated while it is submerged in the medium and the latter is aerated, by agitation or other suitable means, and the antibiotic substance (preferably in the form of its sodium salt) is recovered from the mold filtrate.

Preferably, the liquid nutrient medium used is a basic Czapek-Dox medium with the addition of adjuvant substances, especially brown sugar and corn steep liquor. Preferably, also the antibiotic substance is recovered from the mold filtrate by adjusting the pH of the filtrate to about 2–4, extracting with an organic solvent for organic acids, and extracting the organic-solvent solution with an aqueous buffer solution having a pH of about 7. The buffer solution of the antibiotic substance may be used as such, or further treated to recover the antibiotic substance. Desirably, the antibiotic substance is recovered in the form of its therapeutically-utilizable alkali salt (e. g., the sodium, magnesium, or calcium salt), by treating a solution of the antibiotic substance, partially-purified, in an organic solvent with an aqueous alkali in such manner that the pH of the aqueous phase does not rise above about 7. All operations with the antibiotic substance in aqueous solution at a pH outside the range 4–8 are desirably conducted at low temperature, to minimize loss by inactivation.

The sodium salt of the antibiotic substance, for example, is a highly active antibiotic substance, its biological characteristics so far investigated closely resembling those of sodium-penicillin. Thus, in vitro, both are highly active against gram-positive organisms and relatively inactive against gram-negative organisms; both protect mice in equal degree against pneumococcus infection; both are highly soluble, and hence readily absorbed and quickly excreted by the kidneys, and relatively non-toxic; cultures resistant to the action of sodium-penicillin are resistant also to the sodium salt of the antibiotic substance but not to other antibiotic substances; and a bacterial enzyme active against sodium-penicillin is active also against the sodium salt of the antibiotic substance but not against other antibiotic substances tested. Unlike aspergillic acid, the sodium salt of the antibiotic substance is relatively inactive against gram-negative organisms in vitro, has low toxicity, has high activity in vivo, is relatively unstable (being inactivated more or less rapidly on standing at room temperature at a pH below 5 or above 7.5), and can be adsorbed on aluminum oxide.

The following example is illustrative of this invention:

(a) Inocula of a spore suspension of *Aspergillus flavus* (obtained from a strain of the mold known to produce a large amount of aspergillic acid when grown on the surface of a suitable broth) are made into two-liter Erlenmeyer flasks each containing one liter of Czapek-Dox medium to which has been added 1.5% corn steep liquor and 1% crude brown sugar; and the flasks are subjected to moderate agitation sufficient to cause some aeration of the medium, the temperature being maintained at 23–28° C. After 10–14 days (when the pH reaches 8–8.4), the media are removed from the flasks, pooled, and filtered.

(b) 8500 cc. of the culture filtrate is cooled to about 0° C., acidified to pH 2–3 with phosphoric acid, and extracted with three portions of ether, each having one-fourth the volume of the filtrate. The ether extracts are combined, washed once with cold water, and then extracted with three 500-cc. portions of M/15 phosphate buffer of pH 6.5.

(c) The buffer solution is cooled to about 0° C., acidified to pH 2–3 with phosphoric acid, and extracted with three portions of ether, each one-fourth the solution volume. The ether extracts are combined, and extracted with small portions of 1% sodium bicarbonate solution until the last extract has a pH of 6.5. These extracts are then combined and lyophilized (i. e., dried by freezing and subjecting the frozen material to a high vacuum to sublime out the water), yielding about 200 mg. of the dry sodium salt of the antibiotic substance, which salt has a potency of about 100 Florey units per mg., is relatively stable, is suitable for therapeutic use, and represents a recovery of 42% of the activity present in the culture filtrate.

(d) 920 mg. of the sodium salt of the antibiotic substance thus obtained is dissolved in 50 cc. 95% acetone, the gummy material which separates is removed by filtration, and the clear solution is chromatographed on a column of aluminum oxide (which has been washed with dilute sulfuric acid and reactivated by heating at 150° C.). The chromatogram is developed by continued washing with 95% acetone; the light-yellow band formed (containing the most active material) is washed out of the column with 95% acetone, and this wash is treated with 25 cc. of M/15 phosphate buffer of pH 7.0, and the acetone is removed by distillation. The buffer solution, which contains 40% of the original activity, is cooled to about 0° C., acidified to pH 2-3 with phosphoric acid, and extracted with three portions of ether, each having one-fourth the volume of the buffer solution; the ether extracts are combined, and extracted with small portions of 1% sodium bicarbonate solution until the last extract has a pH of 6.5; and the extracts are combined and lyophilized. The purified sodium salt of the antibiotic substance, obtained in a yield of about 80 mg., is an amorphous, brownish, water-soluble powder having a potency of 240 Florey units per mg., a specific rotation $[\alpha]_D$ of $+108°$ (in water), and contains the elements carbon, hydrogen, nitrogen, and sodium in the respective proportions of 45.36, 4.16, 3.02, and 13.36.

(e) (Alternative.) The buffer solution is cooled to about 0° C., acidified to pH 2-3 with phosphoric acid, and extracted with three portions of ether, each having one-fourth the volume of the buffer solution. The ether extracts are combined, and shaken (in the presence of ice) with several small portions of a 1% aqueous suspension of pure calcium carbonate; and the extracts so made are combined, filtered, and evaporated to dryness in vacuo. The residue, the calcium salt of the antibiotic substance, is water-soluble and suitable for therapeutic use.

A suspension of *Aspergillus flavus* spores suitable for use as the inoculum is obtainable by scraping the spores from the surface of Sabouraud agar plates, placing them in distilled water in a tightly stoppered bottle, and shaking the bottle for a half hour. Preferably, a light inoculum is used, the concentration being, say, 1%.

The medium used in the foregoing example may be replaced by various other liquid nutrient media, inter alia, tryptone, casein hydrolysate, and beef-heart infusion broth, with the addition of brown sugar or corn steep liquor. Best results, however, are obtained with a medium containing essential, i. e., nutrient salts (i. e., $NaNO_3$, $KH_2PO_4$, and $MgSO_4$) and crude carbohydrate (inter alia, yeast extract, corn steep liquor, brown sugar, molasses, or combinations thereof), especially with a modified Czapek-Dox medium to which has been added brown sugar and corn steep liquor. The following compositions are illustrative of such preferred media:

| Components | | Medium I | Medium II |
| --- | --- | --- | --- |
| $NaNO_3$ | grams | 6 | 3 |
| $KH_2PO_4$ | do | 1.5 | 1 |
| $MgSO_4.7H_2O$ | do | 0.5 | 0.5 |
| Brown sugar | do | 10.0 | 10.0 |
| Corn steep liquor | milliliters | 15.0 | 15.0 |
| Distilled water | do | 1,000.0 | 1,000.0 |
| $CaCO_3$ | grams | 5.0 | |
| KCl | do | | 0.5 |
| $FeSO_4.7H_2O$ | do | | 0.01 |

The production of the antibiotic substance may, of course, be effected in larger volumes of medium; e. g., in a large container equipped with a stirrer and a tube for introduction of air and filled to about half capacity with the medium.

The ether employed in the foregoing example for extracting the culture filtrate may be replaced by other organic solvents for organic acids, inter alia, amyl acetate and chloroform; and the sodium bicarbonate solution used for forming the sodium salt may be replaced by sodium carbonate or even sodium hydroxide solution, if the extraction is so conducted that the pH of the aqueous phase does not rise above about 7 (e. g., by employing small portions of a dilute solution of the alkali).

The potency unit referred to herein is the Florey (Oxford) unit used in the United States of America for standardizing therapeutic penicillin preparations.

The invention may be variously otherwise embodied within the scope of the appended claims.

We claim:

1. The method of producing an antibiotic substance comprising growing *Aspergillus flavus* in submerged culture in a medium containing nutrient salts, brown sugar and corn steep liquor, filtering the culture medium, and recovering from the filtrate an antibiotic substance adsorbable on aluminum oxide.

2. The method of producing an antibiotic substance comprising growing *Aspergillus flavus* in submerged culture in a medium containing nutrient salts, brown sugar, and corn steep liquor, filtering the culture medium, adjusting the pH of the filtrate to about 2-4, extracting it with ether, and extracting the ether solution with an aqueous buffer solution having a pH of about 7.

GEOFFREY W. RAKE.
OSKAR WINTERSTEINER.
HAROLD B. MACPHILLAMY.
CLARA M. McKEE.

REFERENCES CITED

The following references are of record in the file of this patent:

UNITED STATES PATENTS

| Number | Name | Date |
| --- | --- | --- |
| 2,006,086 | May et al. | June 25, 1935 |

OTHER REFERENCES

White et al., Jr., Bacteriology, May 1943, pages 433-442.

Jones et al., ibid., pages 461 to 469.

May et al., Jr., Ind. & Eng. Chem., May 1934, pp. 575-578.

Reid, Jr., Bacteriology, vol. 29, 1935, pp. 215 and 217.

White Science, August 9, 1940, page 127.

Abraham et al., The Lancet, August 16, 1941.

White, Jr., Bacteriology, January 1942, page 12.

Hobby, Proc. Soc. Exp. Biol. & Med., June 1942, page 277.

Moyer et al., An Improved Method for the Production of Penicillin, a paper distributed in New York city, December 17, 1941, pages 1 to 5.